United States Patent [19]

Hong

[11] 3,726,979
[45] Apr. 10, 1973

[54] METHOD OF PRODUCING SEROTONIN ANTAGONISM

[76] Inventor: Enrique Hong, Calzada Xochimlco 77, Mexico

[22] Filed: Apr. 9, 1971

[21] Appl. No.: 132,912

[52] U.S. Cl. .................................................. 424/250
[51] Int. Cl. ............................................. A61k 27/00
[58] Field of Search .............................. 424/250, 251

[56] References Cited

UNITED STATES PATENTS 3,274,194   9/1966   Hayao .............................. 260/256.4

*Primary Examiner*—Stanley J. Friedman
*Attorney*—Joseph C. Schwalbach, Louis E. Davidson, Harry T. Stephenson and George R. Caruso

[57] ABSTRACT

Certain quinazolinedione derivatives have been found to be effective serotonin antagonists when administered to warm blooded animals either orally or parenterally.

10 Claims, No Drawings

METHOD OF PRODUCING SEROTONIN ANTAGONISM

BACKGROUND OF THE INVENTION

Various pharmacological agents such as 1-methyl-4-(5-dibenzocycloheptatrienylidene)-piperidine hydrochloride (hereinafter referred to as cyproheptadine) and N-[1-(hydroxymethyl)-propyl]-1-mehtyl lysergamide (hereinafter referred to as methysergide) which antagonize the action of serotonin have been used in the past to treat migraine headaches and to produce an increase of appetite and weight in children and adults.

The clinical use of the known antiserotonin agents is limited by the frequency with which they elicit adverse side effects. Thus, cyproheptadine may produce drowsiness, dryness of the mouth, mental confusion, dizziness, fatigue, nausea and headache, whereas methysergide may elicit nausea, restlessness, leg cramps, vomiting, diarrhea, insomnia and dermatitis. Thus, a new serotonin antagonist was sought which would have the same order of potency but produce fewer side effects than the compounds presently used for this purpose.

SUMMARY OF THE INVENITON

It has now been discovered that serotonin antagonism can be produced in a warm blooded animal by admisinstering an effective amount of a compound of the formula

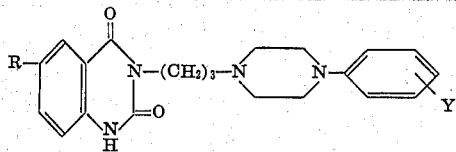

in which R is hydrogen or acetamido and Y is hydrogen or chlorine, and non-toxic, pharmacologically acceptable acid addition salts thereof. Extremely effective are the maleates and hydrochlorides of the compounds wherein R is acetamido or hydrogen and Y is hydrogen in the above formula. These compounds are fully described in U.S. Pat. no. 3,274,194 owned by the assignee of the present invention.

The quinazolinedione derivatives employed in the method of this invention can be administered orally or parenterally in combination with a non-toxic pharmaceutical, liquid or solid carrier. In one dosage form the active ingredient, preferably as a hydrochloride or maleate, is dissolved in sterile, aqueous, isotonic saline solution and stored in vials contining from ½ to 5 milligram dosages. This solution is injected intravenously or intramuscularly, a therapeutic dose ranging from ½ to 15 milligrams per day of said ingredient for animals requiring a serotonin antagonist to gain weight.

To prepare other compositions suitable for use as serotonin antagonists one of the compounds encompassed within the formula hereinbefore set forth is mixed with liquid carriers such as water, vegetable oils, benzyl alcohol, propylene glycol and the like to form a solution, suspension or emulsion. If desired, other substances such as preserving agents, stabilizing agents, wetting or emulsifying agents, buffers or salts can be added. The compounds can also be formulated with solid carriers such as milk sugar, acacia, corn starch, talc, stearic acid, lactose or magnesium stearate and compressed into tablets containing from 2 to 20 milligrams of active ingredient for oral administration at a dosage of from 4 to 60 milligrams per day. Such tablets can be enteric coated with shellac or cellulose acetate phthalate in a manner well kown to those skilled in tablet making art. Likewise, the quinazolinedione compounds per se or in combination with any of the liquid or solid carriers previously enumerated can be sealed in a gelatin capsule to form an oral dosage unit containing from 2 to 20 milligrams of one of said compounds.

DESCRIPTION OF THE PREFERRED EMBODIMENTS

EXAMPLE 1

The ability of several quinazolinedione compounds to block the actions of serotonin was compared with cyproheptadine and methysergide as the reference antiserotonin agents by four different methods set forth below:

1. Rat uterine segment. In this method uterine segments from rats pretreated with diethylstilbestrol 18 hours previously were placed in chambers filled with de Jalon solution at 30°C. Uterine contractions induced by a test concentration of 0.05 micrograms per milliliter of serotonin were obtained before and after the contact of preparations with the compounds tested.

2. Guinea Pig Lung Resistance to Inflation. The procedure described by Konzett et al. in Arch. Exptl. Path. Pharmakol., 195, 71 (1940) was employed in which guinea pigs were anesthetized, artificial respiration was installed and a collateral from the respiration pump was passed through a 10 centimeter water resistance. The volume of the pump was adjusted so that under control conditions the air delivered per stroke did not pass the water resistance, whereas the intravenous injection of 2 micrograms per kilogram of serotonin caused the air to overflow. In this manner, the blockade of serotonin responses produced b the previous administration of the test compounds was determined.

3. Blood Pressure Of The Ganglion Blocked Dog. Pressor responses to intravenous injections of 25 micrograms per kilogram of serotonin were recorded from anesthetized dogs under ganglionic blockade induced by chlorisondamine known chemically as N-[(2-dimethylammonium)ethyl]-4,5,6,7-tetrachloroisoindolinium dimethochloride. The antagonism of serotonin responses produced by the administration of the test compounds was then assessed.

4. Rat Paw Edema. In this test male rats were orally given the test compounds one hour before the subplantar injection of 5 micrograms of serotonin. Paw volumes were determined by mercury displacement as described by Winter et al. in Proc. Soc. Exp. Biol. Med. 111, 544 (1962) immediately and 30 minutes after the serotonin injection. Inhibition of the edema induced by the test compounds was assessed in relation to the edema found in the control rats.

The results of these tests are shown in the table which follows wherein Compound A is 6-acetamido-3-[3-(4-phenyl-1-piperazyl)-propyl]-1,2,3,4-tetrahydyroquinazoline-2,4-dione maleate; Compound B is 3-[3-(4-phenyl-1-piperazyl)propyl]-1,2,3,4-tetrahydroquinazoline-2,4-dione hydrochloride; Compound C is 3-[3-(4-p-chlorophenyl-1-piperazyl)propyl]-1,2,3,4-tetrahydroquinazoline -2,4-dione maleate and Compound D is 3-[3-(4-meta-chlorophenyl-1-piperazyl)propyl]-1,2,3,4-tetrahydroquinazoline-2,4-dione hydrochloride.

| Test Compound Employed | Conc. or Dose That Blocked Serotonin Responses 50% | | | |
|---|---|---|---|---|
| | Method 1 moles ×10⁻⁸ | Method 2 moles/kg. ×10⁻⁸ | Method 3 moles/kg. ×10⁻⁷ | Method 4 moles/kg. ×10⁻⁶ |
| A | 15.9 | 3.3 | 1.3 | 5.1 |
| B | 2.9 | 7.2 | 1.6 | 4.9 |
| C | 166.0 | 12.9 | 1.8 | — |
| D | 235.0 | 46.8 | 10.1 | — |
| Cyproheptadine | 17.0 | 42.7 | 1.1 | 14.8 |
| Methysergide | 52.5 | 1.7 | 3.8 | 1.3 |

EXAMPLE 2

The toxicity of cyproheptadine and Compounds A, B and D of Example 1 was determined by administration of these compounds in graduated oral doses to mice with the following results, LD$_{50}$ being the lethal dose for 50 percent of the mice treated:

| Test Compound | LD$_{50}$ in mg./kg. |
|---|---|
| A | > 1000 |
| B | 740 |
| D | > 1000 |
| Cyproheptadine | 165 |

It is apparent from the foregoing examples that the quinazolinedione compounds employed in the present invention are very effective serotonin antagonists and are far less toxic than the known agents presently used for this purpose. Similar results are obtained when other compounds included in the general formula set forth in the summary of this invention are employed to counteract serotonin responses.

What is claimed is:

1. A method of producing serotonin antagonism which comprises administering to warm blooded animals, having pathologic disorders wherein serotonin is implicated, an effective amount of a material selected from the group consisting of a compound of the formula

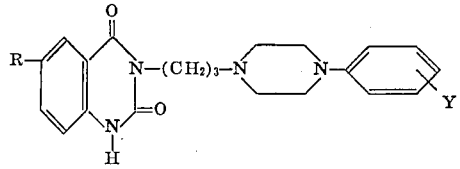

wherein R is selected from the group consisting of hydrogen or acetamide and Y is selected from the group consisting of hydrogen or chlorine, and non-toxic, acid addition salts thereof.

2. A method as in claim 1 in which the compound is administered orally.

3. A method as in claim 1 in which the compound is administered parenterally.

4. A method as in claim 2 in which from 4 to 60 mg. per day of the compound is employed.

5. A method as in claim 3 in which from 0.5 to 15 mg. per day of the compound is employed.

6. A method as in claim 1 in which the compound employed is a hydrochloride.

7. A method as in claim 1 in which the compound employed is a maleate.

8. A method as in claim 1 in which the compound employed is 6-acetamido-3-[3-(4-phenyl-1-piperazyl)propyl]-1,2,3,4-tetrahydroquinazoline-2,4-dione maleate.

9. A method as in claim 1 in which the compound employed is 3-[3-(4-phenyl-1-piperazyl)propyl]-1,2,3,4-tetrahydroquinazoline-2,4-dione hydrochloride.

10. A method as in claim 1 in which the compound employed is 3-[3-(4-p-chlorophenyl-1-piperazyl)propyl]-1,2,3,4-tetrahydroquinazoline-2,4-dione maleate.

* * * * *